Sept. 27, 1932.    S. G. DOWN    1,879,661
BRAKE CONTROLLING VALVE
Filed Nov. 15, 1930
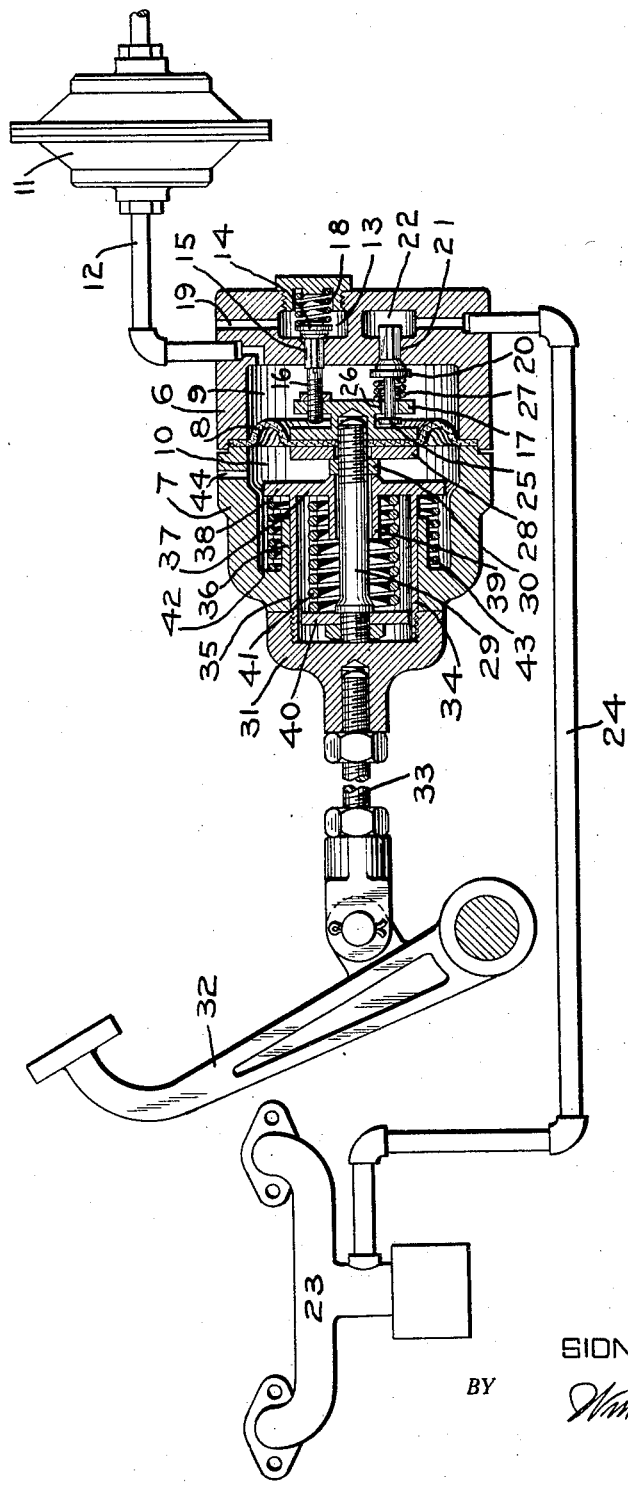
INVENTOR.
SIDNEY G. DOWN
BY *Wm. M. Cady*
ATTORNEY.

Patented Sept. 27, 1932

1,879,661

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE CONTROLLING VALVE

Application filed November 15, 1930. Serial No. 495,917.

This invention relates to brake controlling valves, and more particularly to a controlling valve device for a vehicle of the vacuum type.

An object of the invention is to provide an improved brake valve device of the above character, in which means are provided for controlling and maintaining the amount of vacuum used in effecting an application of the brakes.

Another object of the invention is to provide an improved brake valve device of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, mostly in section, of a brake controlling valve device embodying the invention.

Referring to the drawing, the valve device may comprise a substantially cylindrical casing composed of two sections 6 and 7. Clamped between the meeting edges of the casing sections, is a diaphragm 8 which divides the interior of the casing into two chambers 9 and 10, the chamber 9 being disposed within the casing section 6 and the chamber 10 within the casing section 7. Chamber 9 is connected to a brake chamber 11 by a passage and pipe 12, the chamber 10 is connected to the atmosphere through a port 44.

Contained in a chamber 13 formed in the casing section 6 is a release valve 14. The release valve 14 has a fluted stem extending through an opening 15 formed in the casing between the valve chamber 13 and the diaphragm chamber 9. The extremity of the valve stem is adapted to be engaged by the end of a rod 16 carried by a flanged plate 17 on one side of the diaphragm 8. The release valve 14 is urged toward its seat by a spring 18 contained in chamber 13. Chamber 13 is open to the atmosphere through a vent port or passage 19.

Contained in the diaphragm chamber 9 is an application valve 20 having a fluted stem extending through an opening 21 formed in the casing section 6 between said diaphragm chamber and a chamber 22 which is connected to a source of partial vacuum, such as an intake manifold 23 of an internal combustion engine (not shown), by a pipe 24.

The valve 20 is provided with a headed stem 25, said stem passing through an opening 26 formed in the flanged plate 17. For the purpose of pressing the valve 20 away from the flanged plate 17, a coil spring 27 is interposed between the head of said valve and the flanged plate.

The construction is such that in the normal position of the diaphragm 8, the valve 20 is seated by the pressure of spring 27, while the release valve 14 is held unseated by the engagement of the rod 16 with the end of the stem of the valve 14. The valve 20 is so connected to the diaphragm 8 that a limited amount of movement of the diaphragm relative to the valve 20 is provided for. This is desirable, since it permits the diaphragm to move a slight distance away from the valve 20, when said valve is seated, without unseating the valve.

The diaphragm 8 is clamped between two plates, the flanged plate 17 heretofore referred to, and a plate 28 on the side of the diaphragm facing chamber 10. Projecting from this side of the diaphragm, is a stem 29 which is threaded at both ends. The inner end of the stem 29 passes through the plate 28 and the diaphragm, and is screwed into a threaded opening in the flanged plate 17. Mounted on the inner threaded portion of the stem 29, is a nut 30 which presses the plate 28 and the central portion of the diaphragm against the flanged plate 17.

Abutting the outer end of the casing section 7 is a movable cap 31 which is connected to a brake pedal lever 32, or other manually operated operator part, by a rod 33.

Fixed to the inner face of the cap 31 and projecting into the casing section 7, is a cylindrical member or cage 34. The member or cage 34 is slidably mounted in a bore 35 formed axially of the casing section 7 in an inwardly projecting sleeve-like portion 36. The inner portion of the cage 34 is closed by a wall 37 which is provided with an outwardly extending flange 38 of greater diameter than the sleeve-like portion 36 of the casing.

Centrally of the wall 37, the cage 34 is provided with a tubular portion 39 which is disposed along the longitudinal center line thereof. The stem 29 projects through the tubular portion 39 and terminates in a recess formed within the cap 31. A washer 40 is mounted on the outer threaded end portion of the stem 29, said washer having a diameter slightly less than the diameter of the interior of the cage 34.

Interposed between the washer 40 and the wall 37 of the cage is an expansible coil spring 41, and interposed between the flange 38 and a wall 42 of the casing section 7 is another expansible coil spring 43. The spring 43, acting on the flanged inner end of the cage 34, maintains the inner face of the cap 31 in engagement with the adjacent face of the casing section 7 and the brake pedal lever 32 in the raised position, as shown.

If it is desired to apply the brakes, the brake pedal lever 32 is depressed and this action moves the cap 31 and cage 34 toward the left, against the resistance of spring 43, which latter is compressed by the movement of the cage flange 38 toward the wall 42 of the casing. The outward movement of the cage 34 acts through the spring 41 to move the stem 29 and diaphragm 8 also toward the left.

In the outward movement of the diaphragm 8 the rod 16 first moves away from the stem of the release valve 14, thereby permitting the release valve to be seated by spring 18 so as to close the communication through which the brake chamber 11 is connected to the atmosphere, and the valve 20 is then lifted from its seat by the engagement of the flanged plate 17 with the head of the stem 25. The valve 20 being unseated, chamber 9 is connected to chamber 22 and air is exhausted from the chamber 9 and from the brake chamber 11 by flow through pipe 24, which is connected to the vacuum creating source 23.

The brakes are applied to the extent of the partial vacuum created in the brake chamber 11, and when the pressure in diaphragm chamber 9 has been thus reduced to such an extent that the atmospheric pressure acting on the left side of the diaphragm 8 is sufficient to overcome the pressure of the spring 41, the diaphragm will be deflected toward the right by the higher air pressure in chamber 10 until the valve 20 is seated by the spring 27. Since the deflection of the diaphragm 8 will be slight, the valve 14 will remain seated. It will now be seen that both of the valves 14 and 20 are closed or lapped.

If it is desired to apply the brakes with greater force, the brake pedal lever 32 is further depressed and the diaphragm 8 is again deflected toward the left so as to unseat the valve 20. The partial vacuum in the brake chamber 11 is thus increased and the diaphragm 8 again operates to seat the valve 20, when the vacuum created in chamber 9 has reached a degree sufficient to permit the movement of the diaphragm 8 in the manner hereinbefore described. The maximum brake pressure will be obtained when the brake pedal lever 32 has been depressed sufficiently to bring the flange 38 in engagement with the free edge of the sleeve 36, when further movement of the diaphragm toward the left will be prevented.

The brakes are released by relieving the pressure on the brake pedal lever 32. The partial vacuum in chamber 9 will then pull the diaphragm toward the right, and this action permits the valve 20 to be seated by the spring 27. The valve 14 is then unseated by the engagement of the rod 16 with its stem. With the valve 14 unseated, air at atmospheric pressure then enters the diaphragm chamber 9 and flows to the brake chamber 11 through pipe 12, so that the brakes are released.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

A brake valve device comprising a casing, a diaphragm mounted in said casing and subject to the opposing pressures of the atmosphere and a chamber, a valve for controlling communication from a vacuum source to said chamber, a valve for controlling communication from said chamber to the atmosphere, means carried by said diaphragm for successively operating both of said valves upon movement of the diaphragm in either direction, and means for actuating said diaphragm comprising a sleeve slidably mounted in said casing and having a flange, a spring interposed between said flange and said casing, means for operating said sleeve, a stem connected to said diaphragm, a plate carried by said stem, and a spring interposed between said sleeve and said plate.

In testimony whereof I have hereunto set my hand, this 13th day of November, 1930.

SIDNEY G. DOWN.